(12) United States Patent
Adelmann et al.

(10) Patent No.: US 6,669,360 B1
(45) Date of Patent: Dec. 30, 2003

(54) DEVICE AND METHOD FOR SEALING A DISCHARGE APERTURE IN A ROTATING CONTAINER

(75) Inventors: Dieter Adelmann, Kulsheim (DE); Paul Eirich, Hardheim (DE)

(73) Assignee: Maschinenfabrik Gustav Eirich, Hardheim (DE)

( * ) Notice: Subject to any disclaimer, the term of this patent is extended or adjusted under 35 U.S.C. 154(b) by 0 days.

(21) Appl. No.: 09/723,122

(22) Filed: Nov. 27, 2000

(30) Foreign Application Priority Data

Nov. 26, 1999 (DE) .......................................... 199 56 939

(51) Int. Cl.⁷ ............................................... B01F 15/02
(52) U.S. Cl. ...................................... 366/347; 366/192
(58) Field of Search ................................. 366/347, 184, 366/188, 189, 192; 220/244, 246, 314; 222/504, 556, 557

(56) References Cited

U.S. PATENT DOCUMENTS

| | | | | |
|---|---|---|---|---|
| 2,162,446 A | * | 6/1939 | Scott ........................... | 220/314 |
| 2,231,823 A | | 2/1941 | Ball | |
| 2,271,411 A | * | 1/1942 | Thwaits ....................... | 220/244 |
| 2,349,137 A | * | 5/1944 | Brown ......................... | 220/314 |
| 2,425,942 A | * | 8/1947 | Kooman ...................... | 366/188 |
| 2,823,825 A | * | 2/1958 | Coffman ...................... | 220/314 |
| 2,827,921 A | * | 3/1958 | Sherman et al. ............. | 137/527 |
| 3,727,880 A | * | 4/1973 | Stock .......................... | 137/72 |
| 3,788,596 A | * | 1/1974 | Maeda ......................... | 141/313 |
| 4,033,549 A | * | 7/1977 | Stamer ........................ | 251/298 |
| 4,096,968 A | * | 6/1978 | Treiber et al. .............. | 220/314 |
| 4,127,215 A | * | 11/1978 | Morrison ..................... | 220/314 |
| 4,190,074 A | * | 2/1980 | Mailliet et al. ............. | 251/298 |
| 4,430,002 A | * | 2/1984 | Dongelmans ................ | 366/139 |
| 4,505,072 A | * | 3/1985 | Kobayashi et al. .......... | 366/188 |
| 4,516,859 A | * | 5/1985 | Spengler et al. ............ | 366/189 |
| 4,560,283 A | * | 12/1985 | Eirich et al. ................ | 366/192 |
| 4,566,375 A | * | 1/1986 | van der Schoot ........... | 220/314 |
| 4,586,529 A | * | 5/1986 | Mocquart et al. ........... | 137/268 |
| 4,854,715 A | * | 8/1989 | Eirich et al. ................ | 366/189 |
| 4,911,402 A | * | 3/1990 | Blunt et al. ................. | 251/229 |
| 5,275,303 A | * | 1/1994 | Szalai ......................... | 220/264 |
| 5,305,985 A | * | 4/1994 | Fendley et al. ............. | 251/298 |
| 5,306,396 A | * | 4/1994 | Schlosser et al. ........... | 202/242 |

FOREIGN PATENT DOCUMENTS

| | | |
|---|---|---|
| DE | 486 947 | 11/1929 |
| DE | 501 172 | 6/1930 |
| DE | 29 03 951 | 8/1980 |
| DE | 29 18 348 A1 | 11/1980 |
| DE | 88 16 428 U1 | 9/1989 |
| DE | 92 01 213 U1 | 4/1992 |
| DE | 94 16 517 U1 | 2/1995 |
| FR | 2 535 432 A1 | 4/1984 |
| JP | 58031824 | 2/1983 |

* cited by examiner

Primary Examiner—Tony G. Soohoo
(74) Attorney, Agent, or Firm—Dinsmore & Shohl LLP (57) ABSTRACT

A device and a method for closing a discharge aperture arranged in the base of a container is provided and includes a sealing cover arranged on a pivoting arm via a carrying arm. A mechanism for regulating the positioning of the sealing cover in relation to the discharge aperture is provided, so that the lifting movement of the cover, when entering into the discharge aperture, takes place substantially translatory and substantially parallel to a central axis of the sealing cover, by means of the sealing device. The device is simple to construct and install, yet provides good pressure or vacuum even in long-term use.

28 Claims, 7 Drawing Sheets

DEVICE AND METHOD FOR SEALING A DISCHARGE APERTURE IN A ROTATING CONTAINER

The present invention relates to a device and a method for sealing a discharge aperture in the base of a container, preferably a rotary container of a preparation machine, with a sealing cover arranged on a pivoting shaft by means of a carrying arm.

Such sealing devices are known in principle, in particular for mixing machines with rotating parts. In general, however, the sealing cover is always rigidly connected to the carrying arm and the pivoting shaft. In such an arrangement the sealing cover then unavoidably carries out a circular motion around the pivoting shaft. With this construction, it is disadvantageous that introducing the sealing cover into the discharge aperture of the container base is only possible when there is a considerable clearance between the external diameter of the sealing cover and the internal diameter of the discharge aperture, so the horizontal movement component of the circular motion in the gap caused by the difference in diameter can be brought under control. Because of the gap, with this configuration, there is however the disadvantage of considerable leakage, so no liquid or fine-grained products can be processed in a container closed in this manner.

It has been attempted therefore, with the subject-matter described in DE 29 03 951, to counteract this difficulty in that the sealing device is provided with an elastic bearing. Rubber or plastics parts are described in this case as the elastic member. The elastic element is arranged centrally below the middle of the sealing cover and is surrounded on at least two sides by a bearing bracket. The effective direction or respectively the effective axis of the elastic element is therefore on the one hand perpendicular to the sealing cover and on the other hand it goes directly through the center point of the sealing cover. By means of this construction, it is possible to tip the sealing cover in a limited manner with respect to the carrying arm. In DE 29 03 951, in an advantageous manner, the first part of the sealing movement is carried out as previously by means of a normal circular motion, in which the carrying arm moves by means of the driven pivoting shaft in an arc of a circle. However, as soon as the sealing cover reaches the discharge aperture in the base of the container, and hits it, the return element comes into action and allows limited diversion of the sealing cover from the circular motion, so that it matches up with the discharge aperture, while the carrying arm holding the cover terminates the circular motion. The return element is consequently able to compensate for the difference between the direction of movement between the inside edge of the discharge aperture on the one hand and the outside edge of the sealing cover on the other hand.

This solution has been proven for simple applications, however it is unsuitable for applications using tightly closed containers such as, for example, vacuum or pressure containers. In addition, the return element is difficult to adjust and requires frequent re-adjustment.

In many applications the bases of preparation machines are protected by particularly wear-resistant facings. These can be, for example, compound steel, ceramics or basalt tiles. All these facings are, however, relatively thick, so that discharge apertures unavoidably arranged therein increase in depth. In order to close such deep discharge apertures, a very large deviation of the cover movement from the circular movement of the carrying arm is necessary. The cover must, on the other hand, be inserted in an approximately linear manner into the discharge aperture. The known sealing devices are not in general sufficiently capable of sealing such deep discharge apertures satisfactorily tightly.

The object of the present invention is therefore to provide a sealing device with which, in spite of simple construction and advantageous insertion characteristics, a reliable closure with good sealing is provided, which allows long servicing intervals, and also ensures pressure or vacuum sealing capability during long-term use.

With respect to the device, this object is solved in that a means for regulating or respectively for controlling the position of the sealing cover in relation to the discharge aperture is provided so that the lifting movement of the cover when entering the discharge aperture is substantially linear, that is to say translatory, and can take place substantially parallel to the central axis of the sealing cover.

This means that, before or at the start of entry into the discharge aperture of the container, optionally also by means of engaging with the edge of the aperture, the cover tips over into an orientation substantially parallel to the plane of said edge of the aperture, and is moved in this orientation into its final sealing position. The regulating or respectively the controlling of the cover tipping can take place both actively or passively.

One possibility for implementing such regulating, or respectively controlling, is, for example, in that the sealing cover is connected via a return element to the carrying arm, so that the sealing cover can be tipped with respect to the carrying arm about at least one tipping axis. In this case, the tipping axis is advantageously arranged parallel to the pivoting shaft. This return element allows a defined tipping movement of the sealing cover with respect to the carrying arm, about the tipping axis. The tipping movement can be caused both by active controlling, for example, using a drive means, or by passive controlling, for example, by the sealing cover coming into engagement with the inside edge of the discharge aperture.

A preferred embodiment provides that the return element is arranged such that its effective axis lies outside the plane spanned by the tipping axis and a connecting line between the tipping axis and the center point of the sealing cover.

The effective axis can run, for example, parallel to the plane described. An arrangement is particularly preferably, however, in which the effective axis of the plane described forms an angle of at least 10°, preferably at least 20°, and particularly preferably 30°. According to the type of application, a larger angle between the effective axis and the plane described can also be advantageous.

The return element is arranged in an alternative embodiment such that a connecting line between the effective points of application of the return element to a closest, parallel line passing through the tipping axis, has a clear distance which is preferably more than 10% of the radius of the cover. When the tipping axis intersects the axis of the sealing cover, the return element is preferably arranged asymmetrically to the axis of the sealing cover. In this way it is possible to tip over the sealing cover much further with respect to the carrying arm. The elongation excursion or respectively the spring excursion of the return element is greater, the further the return element is arranged away from the axis of the sealing cover.

In particular for larger degrees of elongation of the preferably elastic return element, and/or with stronger forces operating on the return element, it is advantageous to make the return element from one or more springs. Advantageously, compression springs or combinations of compression and tension springs are used.

Alternatively to this, the return element can also be a hydraulic or a pneumatic cylinder. Additionally, an embodiment is particularly preferred in which the return force of the return element is adjustable. The sealing device can in this way be easily adapted to the properties of the discharge aperture such as, for example, the depth of the discharge aperture, or to the counter forces existing. The alteration of the depth of the discharge aperture or alterations in the elastic member caused by aging can be compensated for by re-adjustment of the return force of the elastic member.

Where the return element is composed of one or more springs, a tension screw can be provided which controls the pre-tensioning of the springs. In the case of pneumatic or hydraulic operating cylinders, the cylinder is connected to a pressure source and a pressure regulator. In this way the pressure can be varied in a pressure accumulator, and thereby the return force of the return element adjusted.

In order to more evenly distribute the ratios of force during the sealing procedure, it can be advantageous when the point of rotation of the tipping axis is not on the central axis of the sealing cover.

A particularly advantageous embodiment of the present invention provides a means for determining the tipping angle between the carrying arm and the sealing cover. This can be done, for example, by measurement of displacement and/or signaling of the end position.

Such determination is also possible without a means for controlling or respectively for regulating the position of the cover in relation to the discharge aperture. In this way, it is possible, inter alia, to determine whether the sealing cover sits properly on the discharge aperture once the sealing procedure is terminated. In addition, when the sealing procedure is terminated, a signal can be given to other means which then, for example, ensure refilling of the rotary container. This signal can, in addition, be stored in a system for production data acquisition (PDA).

The sealing capability of the sealing device can be further increased when the sealing cover is provided with a sealing ring which can be inflated or pumped up. Any soiling possibly present on the inside of the discharge aperture and/or the outside of the sealing cover, as well as changes caused by aging can be compensated for with the sealing ring that can be inflated or pumped up. It is further possible to provide a larger clearance between the sealing cover and the discharge aperture. After the sealing cover is tipped into or respectively inserted into the discharge aperture, the sealing ring is inflated or pumped up, and ensures a high degree of sealing in this way.

An embodiment is preferred which provides a rotation monitor for determining the rotation speed and/or the rotation acceleration of the sealing cover. In addition, the sealing cover is preferably provided with a rotary drive. It is thus possible, for example, to regulate the speed of rotation of the sealing cover during the sealing procedure. It can be matched to the speed of rotation of the container or respectively the discharge aperture. In this way friction between the sealing cover and discharge aperture during the sealing procedure is minimised and the useful life of the sealing ring increased.

Advantageously, the conversion of the original circular pivoting movement of the sealing cover into a substantially linear movement, that is to say the controlling of the position of the cover with respect to the discharge aperture, during the insertion of the sealing cover into the discharge aperture, is further improved in that the pivoting shaft of the carrying arm can be displaced.

This displacement capability is preferably ensured by means of adjustable eccentric bearing of the pivoting shaft. By adjusting the eccentric bearing, the pivoting shaft and thereby the point of rotation of the carrying arm, can then be matched. Advantageously, the adjustment of the eccentric bearing of the pivoting shaft then takes place automatically with the pivoting of the carrying arm, wherein a drive mechanism is provided for this purpose.

Clearly, the return element can be omitted altogether. The capability for displacement of the pivoting shaft described is an alternative possibility for controlling the position of the sealing cover.

The sealing device described unavoidably requires adjusting and servicing work at certain intervals. Normally, these are carried out according to a fixed, predetermined interval of time. An advantageous configuration of the present invention provides that an optical monitoring means is provided, which is preferably fitted to an extension arm of the bearing housing of the sealing cover. The optical monitoring means, which can be, for example, a camera or a lens of an endoscope, can be mounted in an appropriate manner on the sealing cover because of the extended mobility of the sealing cover implemented herein, so the viewing angle of the optical monitoring means is also enlarged with the mobility of the sealing cover. In this way in the run-up to necessary cleaning and servicing operations, it can be determined whether, and to what extent these are necessary.

The servicing intervals can be further increased by a cleaning device for cleaning the inside of the discharge aperture and/or the outside of the sealing cover.

With respect to the method, the object described in the introduction is solved in that the position of the sealing cover in relation to the discharge aperture is regulated or respectively controlled, so that the lifting movement of the cover when entering the discharge aperture is done in a substantially translatory manner without rotation and preferably linear and parallel to the central axis of the sealing cover.

As described hereinabove, the control of the rotary, movement of the cover, that is to say the changing of its tipping angle with respect to the carrying arm, can also be done passively, in that the cover comes into contact with the edge of the discharge aperture.

Because the position of the sealing cover in relation to the discharge aperture or respectively of the tipping angle between the sealing cover and carrying arm, is adjusted, precise introduction of the sealing cover into the discharge aperture can be ensured. This makes a smaller clearance possible and leads to increased sealing capability of the closure. It is of importance that by means of this adjustment, the circular motion of the carrying arm and thereby also of the sealing cover, is modified into a more linear or translatory movement (that is to say without further about the tipping axis) made parallel to the central axis.

This regulation is done either by changing the tipping angle between the carrying arm and the sealing cover and/or by means of adjusting the pivoting shaft before or respectively during the entry of the cover into the discharge aperture. The regulating of the tipping angle between the carrying arm and sealing cover generally leads to improved results. In the case of particularly hostile or dangerous materials, there is a desire to have as few machine elements as possible in the region touched by the material, or respectively to minimise as far as possible the necessity of access by personnel. For this specific case, the control of the curve of movement of the sealing cover is advantageously implemented by a change in position of the point of rotation of the pivoting shaft. This can be obtained by a linear displacement of the shaft bearing or by arranging the bearing in a rotary eccentric mechanism, which is connected to a rotary drive.

In order to increase the sealing capability, a particularly preferred method provides that in a closed position of the sealing cover, a sealing ring which can be inflated or pumped up, surrounding the sealing cover or the discharge aperture, is expanded. Thus according to the invention, the sealing cover is firstly put into the filling aperture, and subsequently the sealing ring is inflated or pumped up. An extremely high degree of sealing capability of the sealing cover is consequently ensured.

A particularly advantageous method provides that the tipping angle and/or the position of the pivoting shaft are determined, and the regulation of the sealing cover setting takes place dependent upon the values determined. In this way it is ensured that changes possibly occurring over time, which for example can be due to aging, can be adapted to by regulation of the sealing cover position dependent upon the tipping angle determined and/or the position of the pivoting shaft determined.

It is advantageous for the durability of the sealing ring when the sealing cover is put into a rotary motion already during the sealing procedure, so that the speed of rotation of the sealing cover approximately corresponds to the speed of rotation of the container. The sealing cover, is generally mounted in a floating manner, so during the sealing procedure, the sealing cover is pressed against the rotating rotary container. As soon as the sealing cover touches the discharge aperture, there is an acceleration of the sealing cover caused by the friction between the sealing ring and discharge aperture. In this way a slippage occurs between the first contact between the discharge aperture and sealing cover until complete taking up, which leads in the long term to wear on the sealing ring. By matching the speed of rotation of the sealing cover to the speed of rotation of the container, the wear of the sealing ring can be greatly reduced or even prevented.

A particularly advantageous method provides that a cleaning means for cleaning the discharge aperture is controlled dependent upon the position of the carrying arm. In this way the cleaning means can automatically clean the inside of the discharge aperture as required while the container is open. When the sealing cover is closed, the cleaning means is automatically removed from the inside edge of the discharge aperture.

A particularly advantageous method provides a testing mode for testing the state of the sealing ring which has the steps: rotation of the rotary container, sealing the rotary container with the non-driven sealing cover, determination of the speed of rotation of the sealing cover dependent upon the position of the cover during the sealing of the rotary container, and sensing of the operating state of the sealing ring dependent on the speed of rotation determined.

As described hereinabove, the sealing cover mounted in a floating manner accelerates when there is contact with the discharge aperture because of the friction. By means of the method described, the operating condition of the sealing a ring can be decided from the acceleration of the sealing cover. With increasing wear of the sealing ring, there is a slower acceleration and respectively a greater slippage. The sealing ring need therefore not be exchanged after a predetermined interval, but can remain in the sealing device until there is a state of wear which can be directly determined by the slippage.

Alternatively, the positioning of the sealing cover can also be determined optically, and the position of the sealing cover regulated dependent upon the optical determination.

An advantageous configuration of the method according to the invention provides that an optical image capture device which is mounted on the moveable sealing device, is used for monitoring the machine parts surrounding the sealing device.

Because in the open position, the sealing cover is pressed into or respectively onto a cleaning device, the servicing and respectively the cleaning interval can be further increased.

Further advantages, features and possibilities for application of the present invention will be clear from the following description of a preferred embodiment and the associated drawings. There is shown, in:

FIG. 1 a sealing device according to the invention in a closed and in an open position, FIG. 1a the spring excursion of the sealing cover dependent upon the distance of the elastic member from the central axis, FIG. 2 a possible implementation of the elastic member using springs, FIG. 3 a sealing cover with a hydraulic cylinder as the elastic member, FIGS. 4 and 4a a sealing cover with a tipping axis-which does not lie on the central axis, FIG. 5 a sealing cover with an inflatable sealing ring and a device for measuring the tipping angle or respectively the elongation of the return element, FIG. 6 a sealing cover with rotary drive, FIG. 7 a sealing device with displaceable pivoting shaft, FIG. 7a a sealing device with eccentrically mounted pivoting shaft, FIG. 8 a sealing device with cleaning device for the discharge aperture, FIG. 9 a representation of the spring path on a sealing cover, FIG. 10 a sealing device with a cleaning means for the sealing cover.

Figure 1:
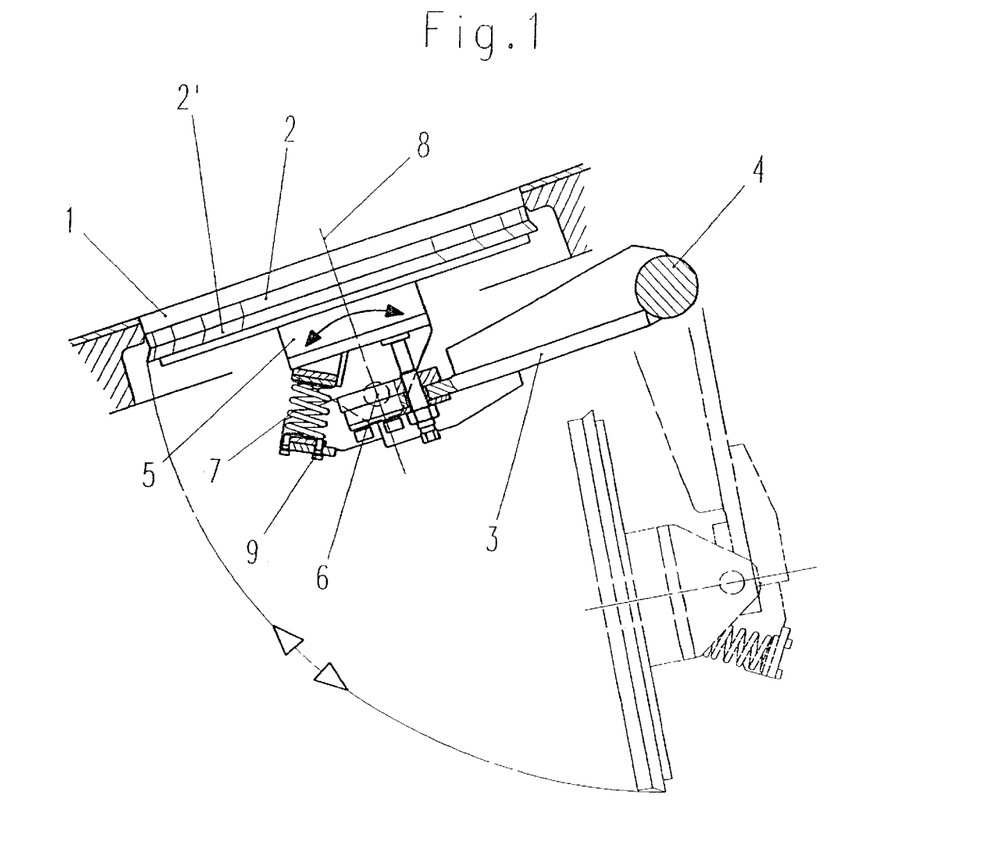
Figure 1A:
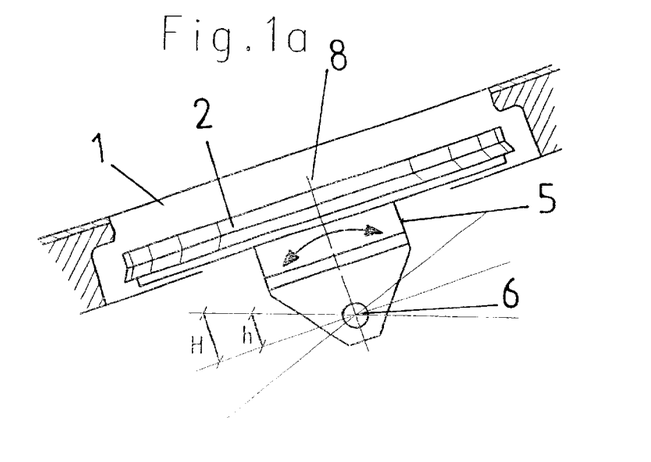
Figure 9:
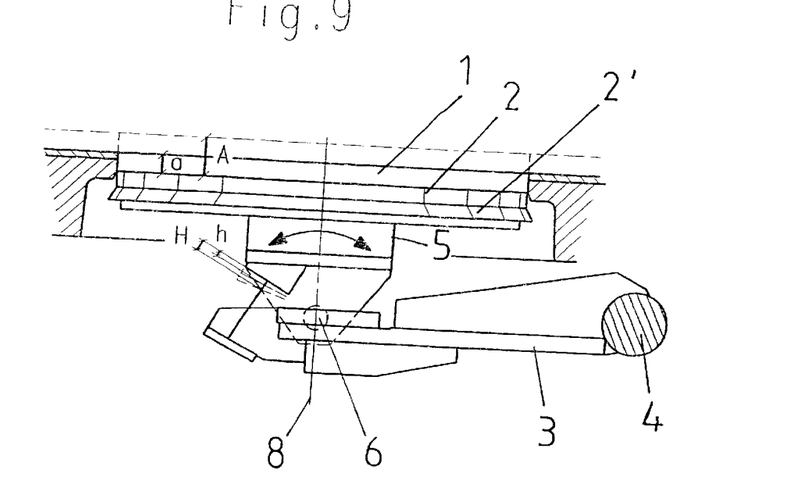

FIG. 1 shows a very simple configuration of the invention. The sealing cover 2 is shown in the position of entry into the discharge aperture 1. A retaining plate of the cover 5 is connected via the bearing bracket and the journals 6 to the carrying arm 3, and consequently is pivotable about the tipping axis of the journal. The carrying arm 3 is rotatably mounted via the pivoting shaft 4. The return element 7 lies outside the connecting line between the tipping axis 6 and central point of the sealing cover 2, that is to say the effective axis of the return element is not on the plane which is spanned by the tipping axis 6 and a connecting line 8 between the tipping axis and the center point of the sealing cover. The greater the angle between the effective axis and this plane, that is to say the further the return element 7 at one of its points of application is away from the central axis 8, the larger the spring excursion of the elastic member. FIG. 1a shows schematically the relationship between the distance of one point of application of the elastic member from the central axis and the spring excursion, h and respectively H. In FIG. 9 the influence of a greater depth of the discharge aperture upon the required sideways diversion of the sealing cover, and therefore upon the spring excursion, is schematically shown.

Figure 2:
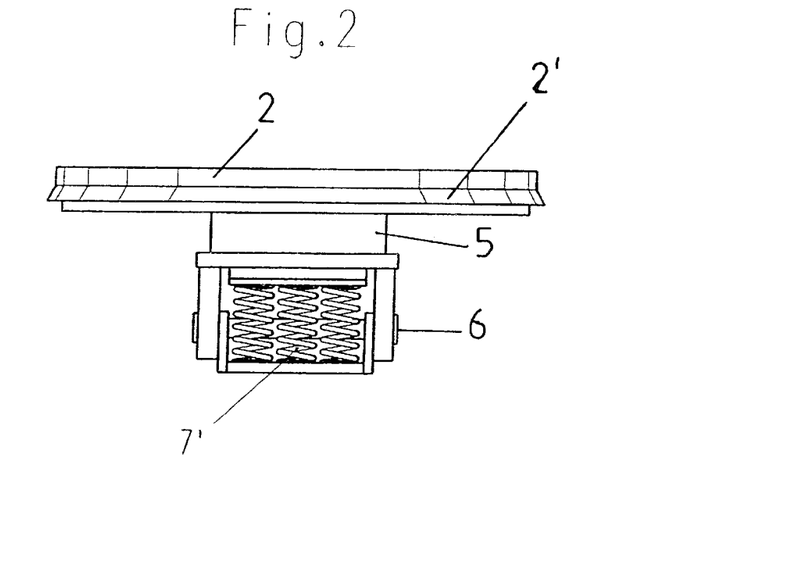

According to the installation conditions and the required actuating forces, the return element can, for example, be composed of one or more springs (see, for example, FIG. 2). As during the course of movement of the sealing device different moments are to be taken up from the sealing cover, according to the task, several springs with different characteristic curves or effective directions (push or pull) can be combined. Springs can, for example, also be arranged concentrically inside one another.

The pre-tensioning of the springs can be set by the tension screws 9.

Figure 3:
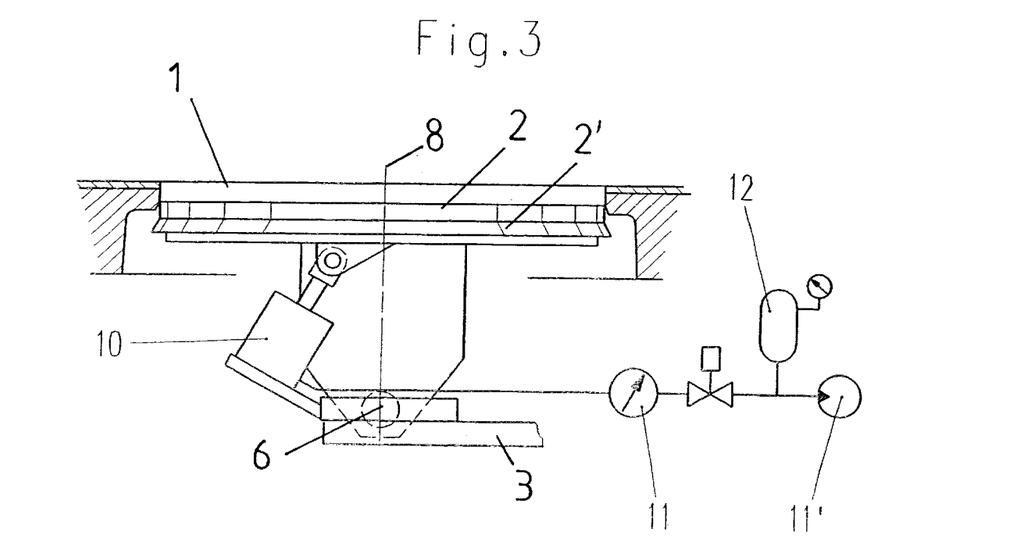

Alternatively to this, the elastic element, as shown in FIG. 3, can also be a pneumatic or a hydraulic operating cylinder 101. The necessary elasticity of the cylinder is ensured by the pressure accumulator 12. In the case of actuated or respectively adjustable cylinders, these are also connected to a pressure source 11' and a pressure regulator 11.

Figure 4:
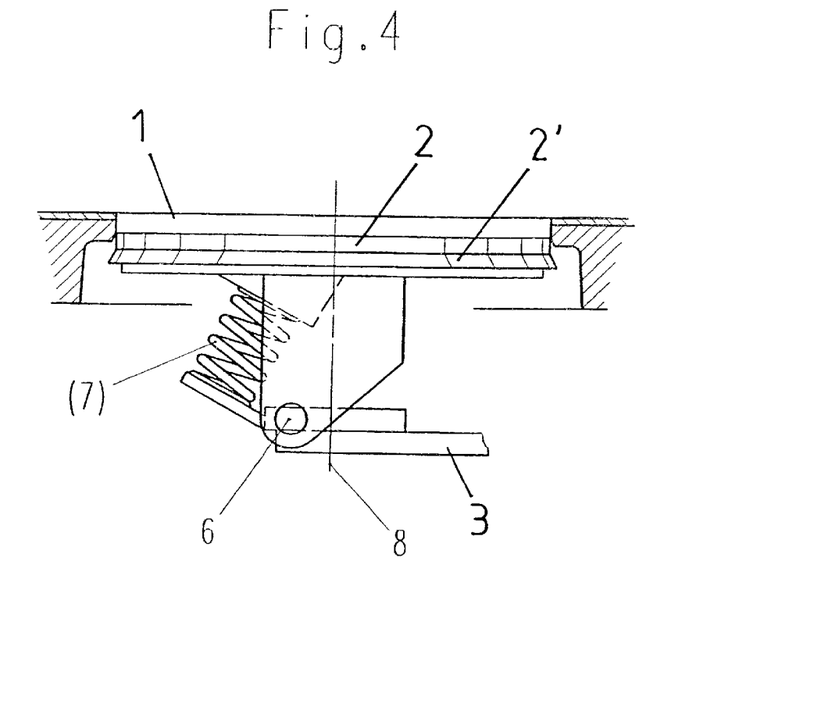
Figure 4A:
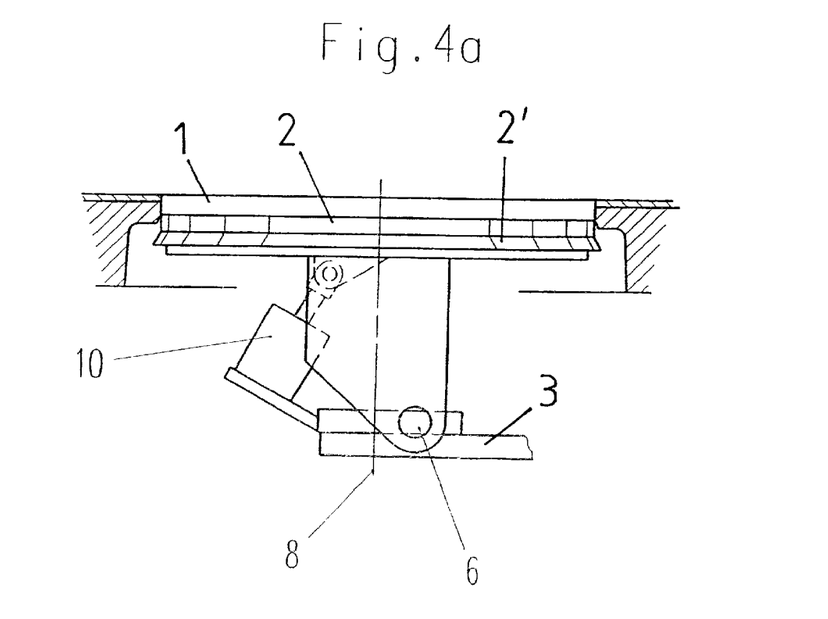

A further application-dependent possibility for adaptation of the force distribution or respectively the moment take-up during the sealing or opening procedure can also be done in that the arrangement of the jointed axle 6 is outside the central axis 8 of the cover, as shown in FIGS. 4 and 4a for example using springs 7 and respectively a cylinder 10.

Figure 5:
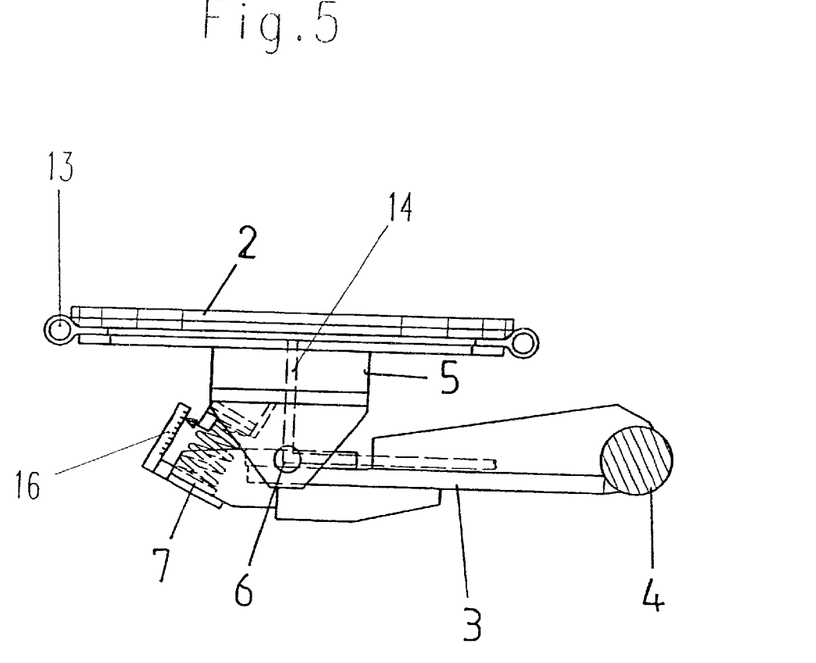

Both when using springs and a cylinder as the elastic member, it is possible to build in path measurement and/or end position signaling, as shown in FIG. 5 and referenced 16.

Solid sealing rings 2' require regular readjustment due to wear. The servicing intervals for this important component can be significantly increased when pneumatically or hydraulically expandable hollow seals 13, as shown in FIG. 5, are used. The conduction of the pressure medium can take place via a line 14 with a rotary connection, arranged in the center of the axis of rotation.

Figure 6:
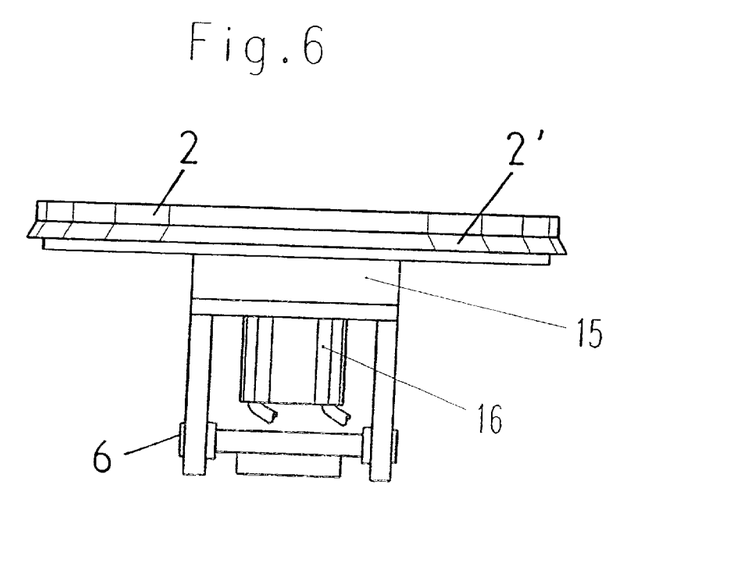

When the cover, which is normally arranged in a floating manner, but not driven, enters into the rotating discharge aperture, on first contact until complete take-up of the sealing cover, there is slippage which leads to wear on the sealing ring in the long term. This disadvantage can be overcome in that on the bearing of the cover a rotary drive 16 is installed. Such a rotary drive, which can be implemented with the aid of a hydraulic motor is shown in FIG. 6. The speed of rotation of the cover is then set such that its outer peripheral speed preferably corresponds to the inside peripheral speed of the discharge aperture. In this way the cover can be inserted into the aperture without any slippage.

Figure 7:
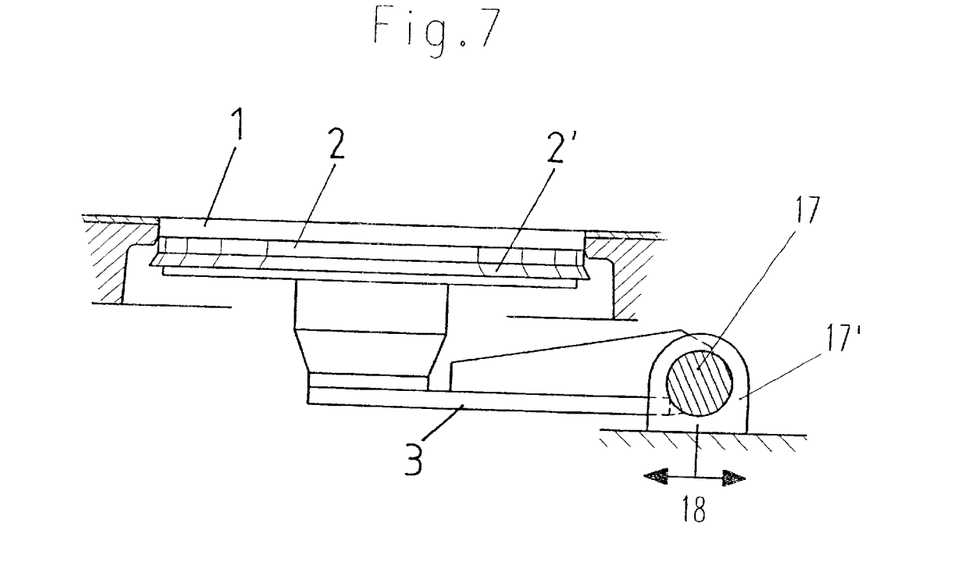
Figure 7A:
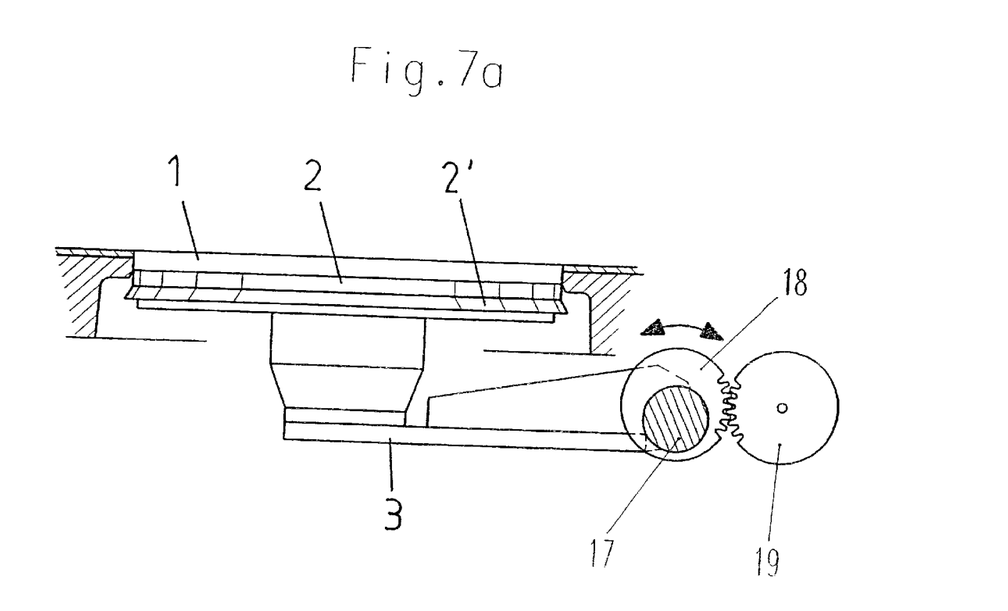

The control of the curve of movement of the sealing cover can alternatively or in combination be done by changing the position of the point of rotation of the pivoting shaft. This can, as shown in FIGS. 7 and 7a, be obtained by a linear displacement 18 of the shaft bearing 17' or by arrangement of the bearing in an eccentric mechanism 18 connected to the rotary drive 19.

Figure 8:
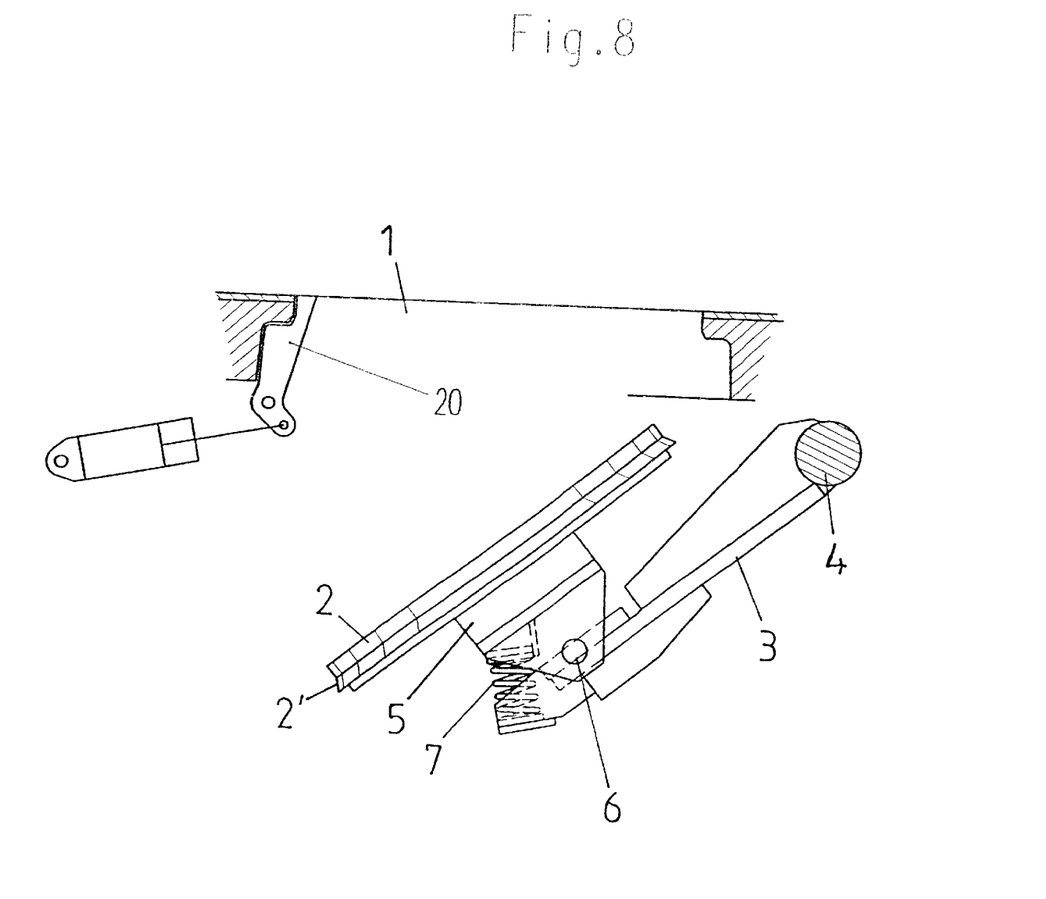

The servicing intervals of the sealing device can also be significantly lengthened in that a scraper 20 is provided which is regularly inserted, dependent upon the drive of the sealing device or respectively the position of the sealing cover, for cleaning off the inside edge of the discharge aperture.

Figure 10:
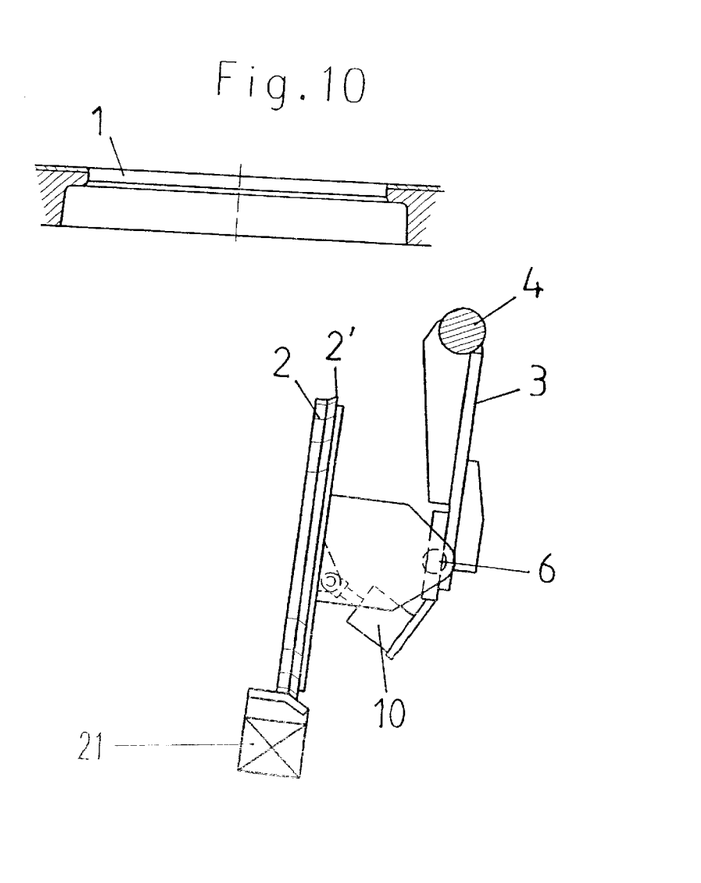

Because of the larger spring path or respectively the stretching path of the elastic element caused according to the invention, the outside edge of the sealing cover can, in the open position, be connected with a cleaning means 21, as shown in FIG. 10, in that the drive used for adjustment of movement is used for tipping the cover against the cleaning means.

The greater mobility of the bearing of the sealing cover can also be used particularly advantageously for attaching an optical monitoring means, for example a camera or a lens of an endoscope. By means of the extended mobility of the bearing obtained, using a controlled movement, the lens of the monitoring device can capture a large portion of the closure and also the machine parts surrounding the closure.

What is claimed is:

1. A sealing device comprising:
    a container defining a discharge aperture therein;
    a sealing cover configured to at least partially fit within said discharge aperture, said cover arranged on a pivoting arm via carrying arm, said cover connected to said carrying arm such that said cover is moveable about at least one tipping axis with respect to said carrying arm; and
    a mechanism that regulates the position of said cover in relation to said discharge aperture such that lifting movement of said cover is substantially translational when entering into said discharge aperture, said translational movement taking place substantially parallel to the central axis of said cover.

2. A device as claimed in claim 1, wherein said sealing cover is connected to the carrying arm via a return element.

3. A device as claimed in claim 2, wherein the effective axis of said return element lies outside of the plane spanned by said tipping axis and a connecting line between said tipping axis and the center point of said sealing cover.

4. A device as claimed in claim 3, wherein the effective axis of said return element is inclined at an angle of at least about 10° with respect to the plane spanned by said tipping axis and a connecting line between said tipping axis and the center point of said sealing cover.

5. A device as claimed in claim 2, wherein said return element comprises one or more springs, and said one or more comprise a combination of compression and tension springs.

6. A device as claimed in claim 2, wherein said return element comprises a pneumatic or hydraulic cylinder.

7. A device as claimed in claim 2, wherein the return force of said return element is adjustable.

8. A device as claimed in claim 2, including a means for determining the elongation of said return element.

9. A device as claimed in claim 1, wherein said tipping axis is at a distance from the central axis of said sealing cover.

10. A device as claimed in claim 1, wherein said sealing cover is provided with an inflatable sealing ring.

11. A device as claimed in claim 1, including a rotation monitor for determining the speed of rotation of said sealing cover.

12. A device as claimed in claim 1, wherein said sealing cover is provided with a rotary drive.

13. A device as claimed in claim 1, wherein said pivoting arm of said carrying arm is displaceable.

14. A device as claimed in claim 13, wherein said pivoting arm of said carrying arm is adjustable by an eccentric bearing on said pivoting arm.

15. A device as claimed in claim 14, including a drive for adjusting said eccentric bearing.

16. A device as claimed in claim 1, including an optical monitor which is attached to an extension arm of the bearing housing of said sealing cover.

17. A device as claimed in claim 1, characterized in that a cleaning device for cleaning the inside of the discharge aperture and/or the outside of the sealing cover is provided.

18. A device as claimed in claim 1, including a control element which controls the tipping angle between said carrying arm and said sealing cover.

19. A method for operating a sealing device for sealing a discharge aperture arranged in the base of a container, said method comprising the steps of:
    configuring a sealing device to include:
        a container defining a discharge aperture therein;
        a sealing cover configured to at least partially fit within said discharge aperture, said cover arranged on a pivoting arm via carrying arm, said cover connected to said carrying arm such that said cover is moveable about at least one tipping axis with respect to said carrying arm; and a mechanism that regulates the position of said cover in relation to said discharge aperture such that lifting movement of said cover is substantially translational when entering into said discharge aperture, said translational movement taking place substantially parallel to the central axis of said cover;

moving said cover about said at least one tipping axis with respect to said carrying arm; and controlling the lifting movement of said cover during entry into said discharge aperture such that movement of said cover is substantially translational and substantially parallel to a central axis of said sealing cover.

20. A method as claimed in claim 19, in which the lifting movement is controlled by altering the tipping angle between said carrying arm and said sealing cover.

21. A method as claimed in claim 19, in which the lifting movement is controlled by adjusting said pivoting shaft.

22. A method as claimed in claim 19, wherein when said sealing cover is in a closed position, an inflatable sealing ring surrounds said sealing cover or said discharge aperture.

23. A method as claimed in claim 22, including testing the state of said sealing ring by:

rotating said container;

sealing said container with said sealing cover;

determining the speed of rotation of said sealing cover dependent upon the position of said cover during the sealing of said container, and determining the operating condition of said sealing ring dependent upon the speed of rotation.

24. A method as claimed in claim 19, including rotating said sealing cover such that the speed of rotation of said sealing cover approximately corresponds to the speed of rotation of the container.

25. A method as claimed in claim 19, including controlling a cleaning device for cleaning said discharge aperture dependent upon the position of said carrying arm.

26. A method as claimed in claim 19, including optically determining the position of said sealing cover and regulating the position of said sealing cover dependent upon the optical determination.

27. A method as claimed in claim 19, including monitoring the machine parts surrounding said sealing cover using an optical image capture device which is mounted on said sealing cover.

28. A method as claimed in claim 19, characterized in that in the open position, said sealing cover is pressed into or onto a cleaning device.

* * * * *